US010883839B2

(12) United States Patent
Sagalovich et al.

(10) Patent No.: US 10,883,839 B2
(45) Date of Patent: Jan. 5, 2021

(54) METHOD AND SYSTEM FOR GEO-SPATIAL MATCHING OF SENSOR DATA TO STATIONARY OBJECTS

(71) Applicant: HERE GLOBAL B.V., Eindhoven (NL)

(72) Inventors: Ilya Sagalovich, Naperville, IL (US); Ishwara Varnasi, Naperville, IL (US); David Ghiurco, Des Plaines, IL (US)

(73) Assignee: HERE Global B.V., Eindhoven (NL)

( * ) Notice: Subject to any disclaimer, the term of this patent is extended or adjusted under 35 U.S.C. 154(b) by 318 days.

(21) Appl. No.: 16/051,036

(22) Filed: Jul. 31, 2018

(65) Prior Publication Data
US 2020/0041275 A1    Feb. 6, 2020

(51) Int. Cl.
*G01C 21/32*       (2006.01)
*G06K 9/00*        (2006.01)
(Continued)

(52) U.S. Cl.
CPC .............. *G01C 21/32* (2013.01); *G06F 16/29* (2019.01); *G06K 9/00818* (2013.01);
(Continued)

(58) Field of Classification Search
CPC .... G01C 21/32; G06F 16/29; G06K 9/00818; G06K 9/3241; G06T 7/74; G06T 2207/30252
See application file for complete search history.

(56) References Cited

U.S. PATENT DOCUMENTS

| 8,527,445 | B2 | 9/2013 | Karins et al. |
| 9,052,207 | B2 | 6/2015 | Miksa et al. |

(Continued)

FOREIGN PATENT DOCUMENTS

| WO | 2009098154 A1 | 8/2009 |
| WO | 2013036709 A1 | 3/2013 |
| WO | 2017021119 A1 | 2/2017 |

*Primary Examiner* — Russell Frejd
(74) *Attorney, Agent, or Firm* — Ditthavong & Steiner, P.C.

(57) ABSTRACT

A method, system, and computer program product is provided, for example, for matching a geospatial message to one or more static objects on a link. The method may include identifying a location of an observation point for observing the one or more static objects from a vehicle on the link. The method may further include applying spatial filtering criteria to each of the one or more static objects based on an observable distance of each of the one or more static objects from the location of the observation point to filter the one or more static objects. The filtering of the one or more static objects may provide one or more filtered static objects. The method may further include calculating a heading of the vehicle and further using the heading of the vehicle for applying a heading filtering criteria to the one or more filtered static objects based on the heading of the vehicle and a pre-computed heading of each of the one or more filtered static objects to provide one or more candidate objects. Additionally, the method may include applying a distance filtering criteria to each of the one or more candidate objects to provide one or more remaining objects. Finally, the method may include matching the geospatial message to at least one of the one or more remaining objects based on the distance filtering criteria.

20 Claims, 6 Drawing Sheets

(51) Int. Cl.
  *G06T 7/73*   (2017.01)
  *G06K 9/32*   (2006.01)
  *G06F 16/29*  (2019.01)

(52) U.S. Cl.
  CPC .............. *G06K 9/3241* (2013.01); *G06T 7/74* (2017.01); *G06T 2207/30252* (2013.01)

(56) References Cited

U.S. PATENT DOCUMENTS

| | | | |
|---|---|---|---|
| 9,848,172 B2 | 12/2017 | Deangelis et al. | |
| 9,940,729 B1 | 4/2018 | Kwant et al. | |
| 2003/0210806 A1* | 11/2003 | Yoichi | G08G 1/20 |
| | | | 382/104 |
| 2014/0198206 A1 | 7/2014 | Murray | |
| 2019/0325349 A1* | 10/2019 | Zhang | G06N 5/046 |
| 2020/0019639 A1* | 1/2020 | Zhang | G06F 16/285 |

* cited by examiner

METHOD AND SYSTEM FOR GEO-SPATIAL MATCHING OF SENSOR DATA TO STATIONARY OBJECTS

TECHNOLOGICAL FIELD

The present disclosure generally relates to a system and method for providing assistance to a driver of a vehicle or the vehicle itself, and more particularly relates to a system and method for matching of a sensor data to stationary objects on a road.

BACKGROUND

Current sensor-based vehicle navigation systems are equipped with various sensors, such as cameras, GPS sensors and the like, which can capture images and other information related to stationary objects on a link. A link generally includes a plurality of connecting pathways such as roads, highways, expressways, freeways and the like. The stationary objects on these links may be, such as, speed signs, both static and variable speed signs, gantries, directional information signboards, banners, hoardings, destination sign boards and the like. The vehicle navigation system may be connected to a backend mapping application server or database which may process the images captured from the vehicle sensors to determine the values posted on these stationary objects, such as on speed signs, and use them for further navigation applications. The communication from the vehicle's navigation system to the mapping application server generally takes place in the form of messages containing information about the image captured by the vehicle's camera and time-aligned geospatial points from the vehicle's GPS sensor.

Currently, the accurate identification of a stationary object requires a lot of processing operations and memory resources making the overall process very expensive. Still, the process suffers from limitations such as being prone to errors because of limitations of vehicle sensors, such as camera and GPS sensors. Thus, what is required is an alternate way for correctly identifying stationary objects on a link using a computationally less expensive process.

BRIEF SUMMARY

In light of the above-discussed problems, there is a need to derive alternate strategies for matching stationary objects, also hereinafter referred to as static objects, on a link.

Current map based navigation systems try to perform matching of GPS coordinates to objects on a link, such as a road, using two stages. First, the process attempts to match the GPS coordinates to a digitized link on the road and then it attempts to find the static objects appearing on that link or on adjacent links. This approach suffers from some limitations, such as being expensive because it requires a map-matcher component to keep in memory a list of all the links on the road and their shape-points. The memory requirements for running a traditional map-matcher are very high. Further, this process is also error-prone because generally a vehicle's camera sensors can "see" across road links. For example, even when the vehicle is driving on link A, it's camera can still detect a sign on link B.

In view of these limitations, the methods and systems disclosed herein provide an alternative way of matching GPS coordinates, or trace points, to static objects on the link while keeping the memory requirements very small. The methods and systems disclosed herein may also provide improved quality over traditional map-matching approach. Instead of keeping in memory all the links of a digital road network, the presented approach keeps in memory only the list of known static objects on the roads. For each such static object, the list contains geospatial coordinates for identifying a location of the static object and a heading of the static object (which describes which way the object is facing). Both the location and the heading of static objects are considered when attempting to match the trace points of a message received from the vehicle to a static object on the road. Thus, the methods and systems disclosed herein propose a way of matching messages directly to static objects without keeping any traditional map data in memory.

The methods and systems disclosed herein provide for matching of contents of a geospatial message to a static object on a link. The method may include identifying a location of an observation point for observing the one or more static objects from a vehicle on the link. The method may further include applying spatial filtering criteria to each of the one or more static objects based on an observable distance of each of the one or more static objects from the location of the observation point to filter the one or more static objects. The filtering of the one or more static objects may provide one or more filtered static objects. The method may further include calculating a heading of the vehicle and further using the heading of the vehicle for applying a heading filtering criteria to the one or more filtered static objects based on the heading of the vehicle and a pre-computed heading of each of the one or more filtered static objects to provide one or more candidate objects. Additionally, the method may include applying a distance filtering criteria to each of the one or more candidate objects to provide one or more remaining objects. Finally, the method may include matching the geospatial message to at least one of the one or more remaining objects based on the distance filtering criteria.

In some example embodiments, an apparatus for matching a geospatial message to one or more static objects on a link may be provided. The apparatus may include at least one processor and at least one memory including computer program code for one or more programs. The at least one memory and the computer program code configured to, with the at least one processor, cause the apparatus to at least identify a location of an observation point for observing the one or more static objects from a vehicle on the link. The apparatus may be further caused to apply a spatial filtering criteria to each of the one or more static objects based on an observable distance of each of the one or more static objects from the location of the observation point to filter the one or more static objects. The filtering of the one or more static objects may be done in order to provide one or more filtered static objects. Further, the apparatus may be caused to calculate a heading of the vehicle. Once the heading is calculated, the apparatus may be further caused to apply a heading filtering criteria to the one or more filtered static objects based the heading of the vehicle and a pre-computed heading of each of the one or more filtered static objects to provide one or more candidate objects. Further, the apparatus may be caused to apply a distance filtering criteria to each of the one or more candidate objects to provide one or more remaining objects. Additionally, the apparatus may be caused to match the geospatial message to at least one of the one or more remaining objects based on the distance filtering criteria.

In some example embodiments a computer program product is provided. The computer program product comprising at least one non-transitory computer-readable storage medium having computer-executable program code instructions stored therein, the computer-executable program code instructions comprising program code instructions for identifying a location of an observation point for observing the one or more static objects from a vehicle on the link. The computer program product further comprising program code instructions for applying a spatial filtering criteria to each of the one or more static objects based on an observable distance of each of the one or more static objects from the location of the observation point to filter the one or more static objects, wherein filtering the one or more static objects provides one or more filtered static objects. The computer program product further comprising program code instructions for calculating a heading of the vehicle. The computer program product further comprising program code instructions for applying a heading filtering criteria to the one or more filtered static objects based the heading of the vehicle and a pre-computed heading of each of the one or more filtered static objects to provide one or more candidate objects. The computer program product further comprising program code instructions for applying a distance filtering criteria to each of the one or more candidate objects based on a first distance and a second distance, to provide one or more remaining objects. Also, the computer program product further comprising program code instructions for matching the geospatial message to at least one of the one or more remaining objects based on the first distance and the second distance.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Having thus described example embodiments of the invention in general terms, reference will now be made to the accompanying drawings, which are not necessarily drawn to scale, and wherein:

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference, numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Definitions

The term "link" may be used to refer to any connecting pathway including but not limited to a roadway, a highway, a freeway, an expressway, a lane, a street path, a road, an alley, a controlled access roadway, a free access roadway and the like.

The term "shape point" may be used to refer to shape segments representing curvature information of various links, such as roadway segments, highway segments, roads, expressways and the like. Each shape point may be associated with coordinate information, such as latitude and longitude information. The intersections of shape points may be represented as nodes.

The term "node" may be used to refer to a point, such as a point of intersection between two line segments, which in some cases may be link segments.

The term "upstream link" may be used to refer to a link in a running direction or direction of travel of a vehicle.

The term "downstream link" may be used to refer to a link opposite to a running direction or direction of travel of a vehicle.

The term "heading" may be used to provide a measure of a direction for a point or a line and may be calculate relative to a north direction or a line-of-sight direction, as may be applicable.

A method, apparatus, and computer program product are provided herein in accordance with an example embodiment for providing an accurate matching of static objects to geospatial messages received from a vehicle's sensor. The vehicle may include a GPS sensor which may be used to send geospatial messages to the backend of a mapping application, wherein the geospatial message may include coordinate information also known as a trace point for a location. The vehicle may also include a camera which may be used to capture images for a static object. The location from where the vehicle captures an image may be known as an observation point. The method, apparatus, and computer program product disclosed herein may use the information from trace points, image information from observation point and calculation of various distance ranges for correctly matching contents of the geospatial message to static objects on the link.

Figure 1:
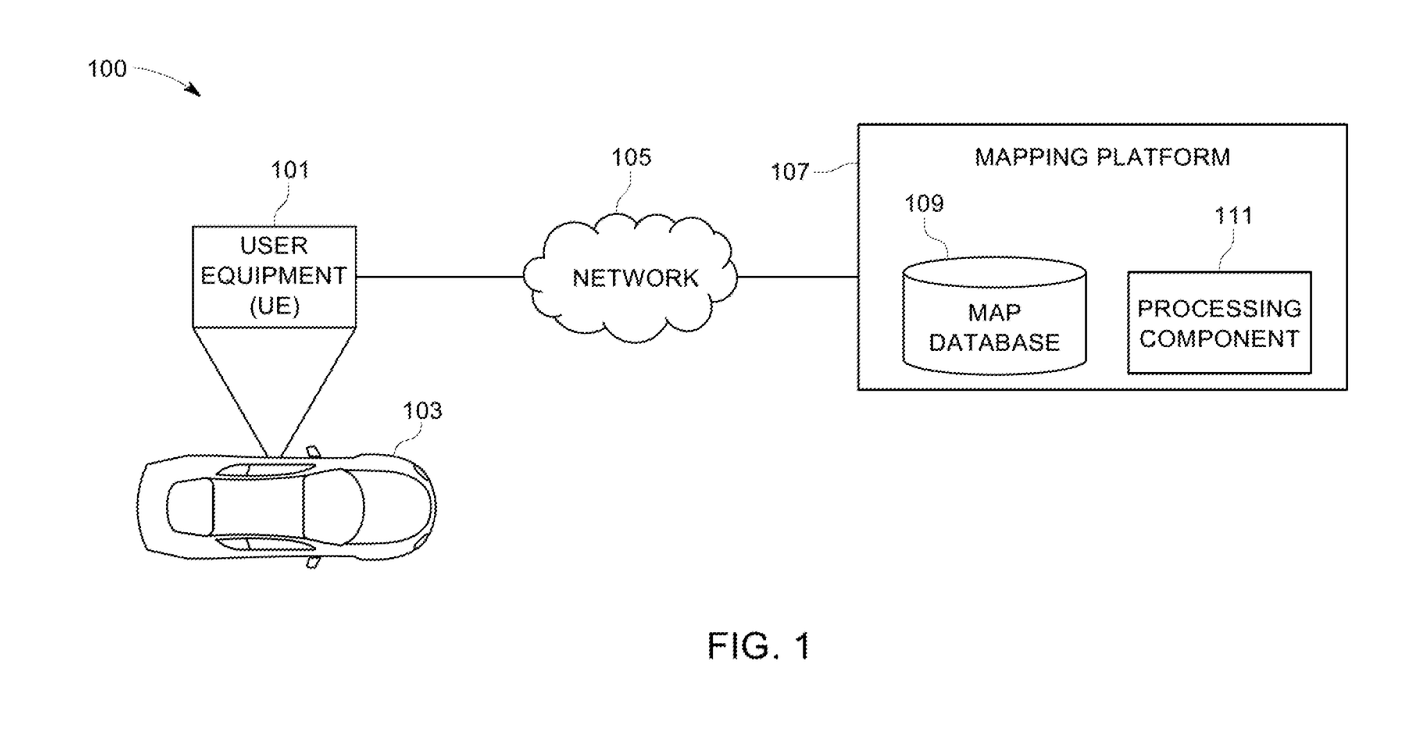
FIG. 1 illustrates a block diagram of a system for matching of sensor data to static objects in accordance with an example embodiment.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation. FIG. 1 illustrates a block diagram of a system 100 for matching of sensor data to static objects in accordance with an example embodiment. The system may include a user equipment 101 installed in a vehicle 103 for detecting one or more static objects on a link, such as on a roadway segment. The one or more static objects may include such as a road sign, a traffic sign, a variable speed sign, a static speed sign, a destination sign, a banner, a hoarding, a flyer and the like. The vehicle 103 may include one or more sensors to detect the one or more static objects. For example, the vehicle 103 may include a camera for capturing an image of a static object on the road. The vehicle 103 may also include a GPS sensor for identifying location coordinates, also known as trace points, for any location on the road. In some example embodiments, the GPS sensor may be configured to send messages related to trace points at different instants of time, such as for identifying static objects on the link. However, GPS coordinate data may be prone to error. To enhance the accuracy of static object detection on the link, GPS sensor data is used in conjunction with various other data, such as spatial filtering criteria, heading filtering criteria and a distance filtering criteria to identify correct static object to match to a GPS coordinate data. The GPS coordinate data may be sent to a mapping platform 107 connected to the vehicle's 103 user equipment 101, in the form of a geospatial message. The user equipment 101 may be connected to a mapping platform 107 over a network 105. The mapping platform 107 may include a map database 109 and a processing component 111.

The network 105 may be wired, wireless, or any combination of wired and wireless communication networks, such as cellular, Wi-Fi, internet, local area networks, or the like.

The user equipment 101 may be a navigation system, such as an advanced driver assistance system (ADAS), that may be configured to provide route guidance and navigation related functions to the user of the vehicle 103.

In some example embodiments, the user equipment 101 may include a mobile computing device such as a laptop computer, tablet computer, mobile phone, smart phone, navigation unit, personal data assistant, watch, camera, or the like. Additionally or alternatively, the user equipment 101 may be a fixed computing device, such as a personal computer, computer workstation, kiosk, office terminal computer or system, or the like. The user equipment 101 may be configured to access the mapping platform 107 via a processing component 111 through, for example, a mapping application, such that the user equipment 101 may provide navigational assistance to a user.

The mapping platform 107 may include a map database 109, which may include node data, road segment data, link data, point of interest (POI) data, link identification information, heading value records or the like. The map database 109 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 109 may contain path segment and node data records, such as shape points or other data that may represent pedestrian paths, links or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 109 can include data about the POIs and their respective locations in the POI records. The map database 109 may additionally include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 109 can include event data (e.g., traffic incidents, construction activities, scheduled events, unscheduled events, accidents, diversions etc.) associated with the POI data records or other records of the map database 109 associated with the mapping platform 107.

A content provider e.g., a map developer may maintain the mapping platform 107. By way of example, the map developer can collect geographic data to generate and enhance mapping platform 107. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Crowdsourcing of geographic map data can also be employed to generate, substantiate, or update map data. For example, sensor data from a plurality of data probes, which may be, for example, vehicles traveling along a road network or within a venue, may be gathered and fused to infer an accurate map of an environment in which the data probes are moving. The sensor data may be from any sensor that can inform a map database of features within an environment that are appropriate for mapping. For example, motion sensors, inertia sensors, image capture sensors, proximity sensors, LIDAR (light detection and ranging) sensors, ultrasonic sensors, GPS sensors and the like. The gathering of large quantities of crowd-sourced data may facilitate the accurate modeling and mapping of an environment, whether it is a road segment or the interior of a multi-level parking structure. Also, remote sensing, such as aerial or satellite photography, can be used to generate map geometries directly or through machine learning as described herein.

The map database 109 of the mapping platform 107 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, driving maneuver related functions and other functions, by a navigation device, such as by user equipment 101, for example. The navigation device may be used to perform navigation-related functions that can correspond to vehicle navigation, pedestrian navigation, and vehicle lane changing maneuvers, vehicle navigation towards one or more geo-fences, navigation to a favored parking spot or other types of navigation. While example embodiments described herein generally relate to vehicular travel and parking along roads, example embodiments may be implemented for bicycle travel along bike paths and bike rack/parking availability, boat travel along maritime navigational routes including dock or boat slip availability, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

In some embodiments, the mapping platform 107 may include a master geographic database configured at a server side, but in alternate embodiments, a client side-mapping platform 107 may represent a compiled navigation database that may be used in or with end user devices (e.g., user equipment 101) to provide navigation and/or map-related functions. For example, the mapping platform 107 may be used with the end user device 101 to provide an end user with navigation features. In such a case, the mapping platform 107 can be downloaded or stored on the end user device (user equipment 101) which can access the mapping platform 107 through a wireless or wired connection, over the network 105. This may be of particular benefit when used for navigating within spaces that may not have provisions for network connectivity or may have poor network connectivity, such as an indoor parking facility, a remote street near a residential area and the like. As many parking facilities are multi-level concrete and steel structures, network connectivity and global positioning satellite availability may be low or non-existent. In such cases, locally stored data of the mapping platform 107 regarding the parking spaces may be beneficial as identification of suitable parking spot in the parking space could be performed without requiring connection to a network or a positioning system. In such an embodiment, various other positioning methods could be used to provide vehicle reference position within the parking facility, such as inertial measuring units, vehicle wheel sensors, compass, radio positioning means, etc.

In one embodiment, the end user device or user equipment 101 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the user equipment 101 for navigation and map functions such as guidance and map display, for example, and for determination of one or more personalized routes or route segments, direction of travel of vehicle, heading of vehicles and the like. The direction of travel of the vehicle may be derived based on the heading value associated with a gantry on a link, such as a roadway segment. In an example embodiment, map database may include information related to the gantry, such as gantry Id, longitude of the gantry in degrees, latitude of the gantry in degrees, heading of the gantry, wherein the heading of the gantry specifies the direction in which the gantry is facing, measured in degrees from true North, in clock-wise direction. This heading can be computed using the two nearest shape-points to the gantry. In most cases, the location of the gantry falls on top of one of a link segment's shape points. Ideally, the shape points selected for computing the heading would be before the gantry to have better correspondence with the heading of vehicles driving on the road. For example, if the gantry is on a segment going from east to west, then one shape point to the east of the gantry will be used. The other shape point used will be on top of the gantry.

Using the data derived from the map database 109, the methods and systems disclosed in the invention may be used to perform matching of static objects with their corresponding geospatial message, or to say GPS sensor data. Thus, the methods and systems performed in context of the system 100 may rely on the availability of up-to-date list of existing static objects, and use it to match the GPS sensor data with their corresponding static object on the link. The static object data included in the list may include data about each static object, such as object ID, latitude and longitude of the static object in degrees, and heading of the static object, wherein the heading is measured in degrees from true North, in clock-wise direction, and time stamp of detecting the static object.

In an example, the list of static objects may be presorted using gantry positions. This may be done to allow faster processing for matching a static object to its corresponding geospatial message. The presorted list may then be used to apply a plurality of filtering criteria to successively filter out unnecessary static objects from the list. These filtering criteria may include such as a spatial filtering criteria, a heading filtering criteria and a distance filtering criteria. The various criteria may be illustrated using the FIGS. 2-5 as follows.

Figure 2:
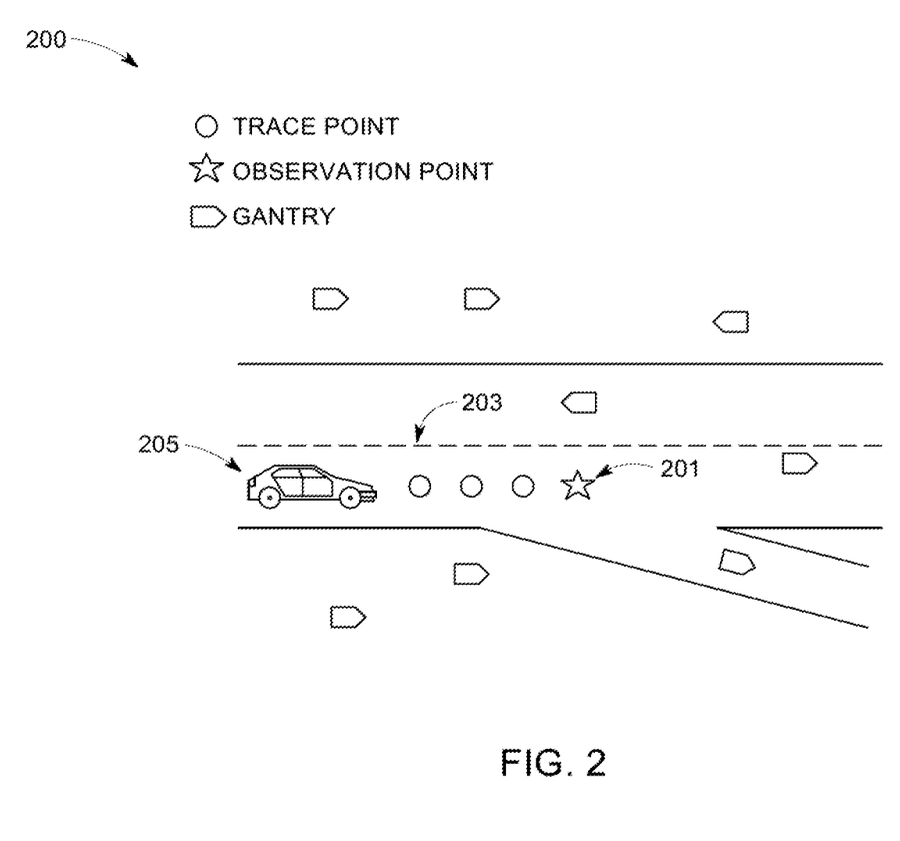
FIG. 2 illustrates a diagram illustrating an exemplary scenario for static object matching in accordance with an example embodiment.

FIG. 2 illustrates a diagram illustrating an exemplary scenario 200 for static object matching in accordance with an example embodiment. The scenario 200 of FIG. 2 illustrates an observation point 201 and three trace points 203 on a link, such as the road, on which a vehicle 205 is travelling. The scenario 200 also illustrates one or more static objects, shown as pentagon arrows near and around the link. The direction in which arrow points is the pre-computed heading of the one or more static objects. The one or more static objects may be one or more gantries placed at various locations on the link. The observation point 201 may be a reference point for taking observation for one or more static objects, such as using the vehicle's 205 camera. A location of the observation point needs to be identified in order to match a static object from one or more static objects to its corresponding geospatial message. For this, the latitude and longitude values of the two trace points closest to the observation point are used for identifying the location of the observation.

In some example embodiments, interpolation may be used to identify the location of the observation point using the two trace points closest to the observation point.

In some example embodiments, extrapolation may be used to identify the location of the observation point using the two trace points closest to the observation point. In some example embodiments, there may be duplicate trace points, such that they may have same latitude and longitude values. Such duplicate points may be removed from a list of trace points for consideration. Similarly, out-of-order trace points may identified based on time-stamps and out-of-order trace points may also be removed from the list.

Since it is known that the observation point would be very close to the trace points, it may be assumed that the earth surface is flat over the short distances and simple linear geometry may be used to identify the location of the observation point.

The identification of the location of the observation point may also include identification of one or more parameters related to the observation, including but not limited to a longitude of the observation point in degrees, a latitude of the observation point in degrees, a heading of the observation point, a linear slope of the observation point, an intersect of the point with the latitude axis and a Boolean value which indicates whether the latitude is increasing at the observation point.

In an example, the location of the observation point may be computed using a single trace point.

In an example, the location of the observation point may be computed using a multiple trace points. In case of the multiple trace points, the list of points is iterated to find an index of a point with a timestamp as large as possible but less than the timestamp of the observation point.

In an example, if the index is found at the end of the list of input points, then extrapolation is used by taking the last two points of the list to compute the observation.

In an example, if the index is found and is not at the end of the list of input points, then interpolation is used by taking the point at the index and another point at index+1.

Once the location of the observation point is identified, a spatial filtering criteria may be applied to each of the one or more static objects based on an observable distance of each of the one or more static objects from the location of the observation point to filter the one or more static objects to provide one or more filtered static objects. The observable distance based spatial filtering may be illustrated in FIG. 3.

Figure 3:
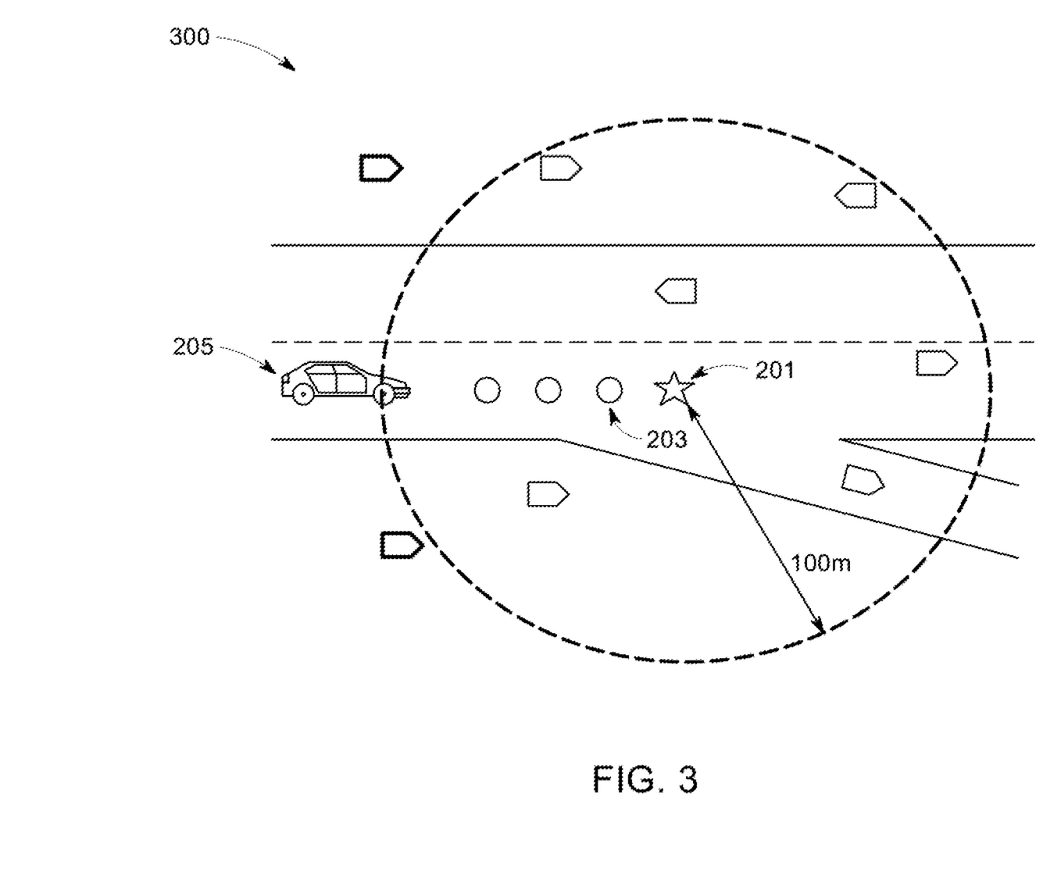
FIG. 3 illustrates an exemplary diagram illustrating a distance criteria for performing spatial filtering for static object matching according to an example embodiment.

FIG. 3 illustrates an exemplary diagram illustrating a distance criterion for performing spatial filtering for static object matching according to an example embodiment.

The example 300 illustrates an observable distance of 100 meters, beyond which all the static objects need to be filtered out from consideration for matching. Thus, all the objects which are more than the observable distance away from the observation point 201, which in the example 300 is 100 meters, will be filtered out. The observable distance threshold of 100 meters is for illustrative purpose only. In other example embodiments, other distance thresholds may be used based on limitations on vehicle 205 sensors, as may be understood by a person of ordinary skill in the art.

In an example, if the vehicle's 205 camera is designed to detect objects correctly only when the objects are within 100 meters from the camera, then all objects more than 100 meters away may be filtered. The filtered-out objects are shown outside of the illustrated dotted circle of radius 100 meters (100 m as shown in FIG. 3) in the example 300.

In an example, the observable distance of 100 meters may be used to specify a bounding box, such as a square, spaced 100 meters around the observation point 201. Thus, all the objects outside the square of 100 meters around observation point may be filtered out.

This initial filtering using the spatial filtering criteria may be made very fast by performing binary search in the pre-sorted list of stationary objects. Thus, the spatial filtering example 300 may be used to quickly eliminate all gantries that may be far away from the observation point 201.

In an example, the spatial filtering criteria may include computing the lower and upper bound for longitude values of the one or more static objects, such as the gantries. The bounds are computed in such a way that they capture all gantries which are within the observable distance range from the observation point 201. The computed lower and upper bounds are then used to get the lower and upper indexes for the list of gantries. Since the list is already sorted by Longitude, a binary search is used to find the indexes.

In an example, apart from longitudinal bounds, latitude and heading filter may also be used to filter out the gantries. The list of gantries may be iterated from the lower search index (inclusive) to the upper search index (exclusive) to find the gantries which are close in latitude and in heading to the observation point 201.

Figure 4:
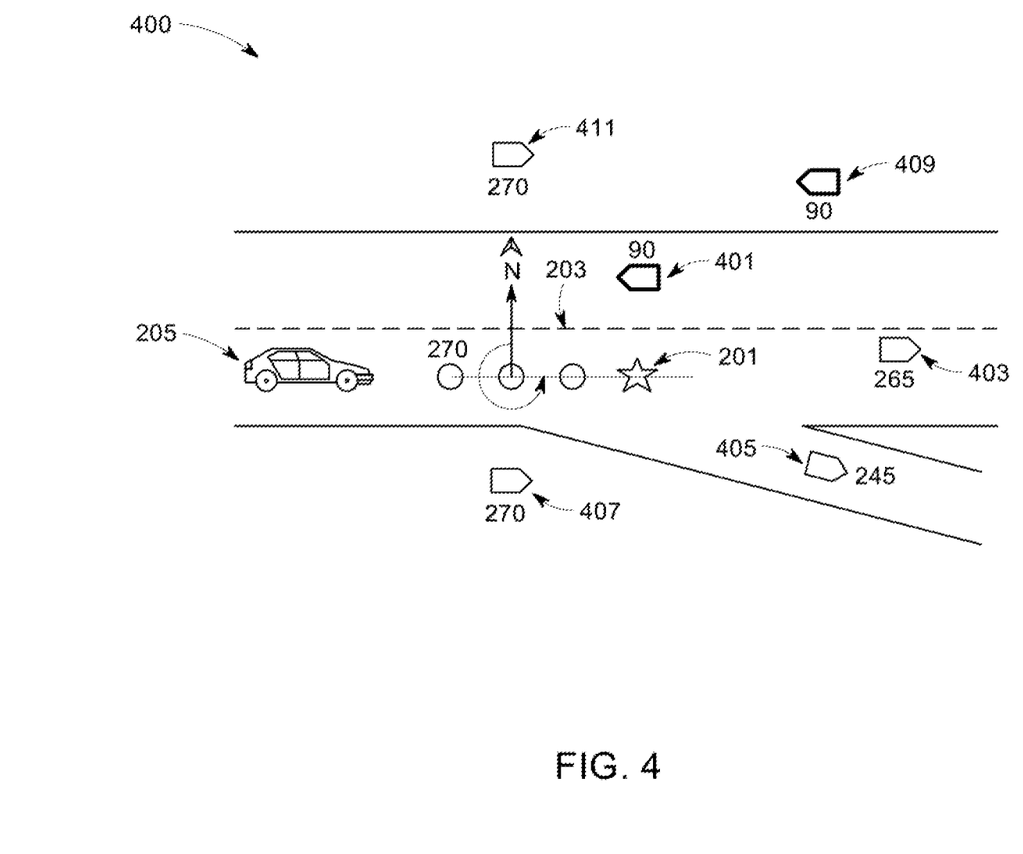
FIG. 4 illustrates an exemplary diagram illustrating a heading criteria for static object matching according to an example embodiment.

Once, the spatial filtering criteria has been applied to provide one or more filtered static objects, the heading of the vehicle may be computed and a heading filtering criteria may be applied to the one or more filtered static objects based on the heading of the vehicle and a pre-computed heading of each of the one or more filtered static objects to provide one or more candidate objects, that is to say, from the set of filtered static objects, a set of candidate objects is derived based on the heading filtering criteria.

FIG. 4 illustrates an exemplary diagram 400 illustrating heading criteria for static object matching according to an example embodiment.

The diagram 400 illustrates headings for the vehicle 205 and one or more static objects. The heading values are computed in degrees from true North, depicted as 'N' in the diagram 400 in counter-clock-wise direction. The different static objects are depicted with their heading values. For example, an object 401 and 409 have heading of 90 degrees, objects 407 and 411 have heading of 270 degrees, object 403 has heading of 265 degrees and object 405 has heading of 245 degrees. The vehicle 205 has heading of 270 degrees. The heading of the vehicle 205 can be computed using the two trace points closest to the observation point 201. When only one trace point is available, the heading of the vehicle 205 can also be extracted directly from the message (most GPS trace data also contains heading). In this example 400, all objects whose heading is different by more than 30 degrees from the vehicle's heading are filtered out.

In the example 400, the gantries 401 and 409 are the filtered-out gantries.

In an example, the heading may be measured in clock-wise direction from true north.

In another example, the heading may be measured in counter-clock-wise direction from true north.

Figure 5:
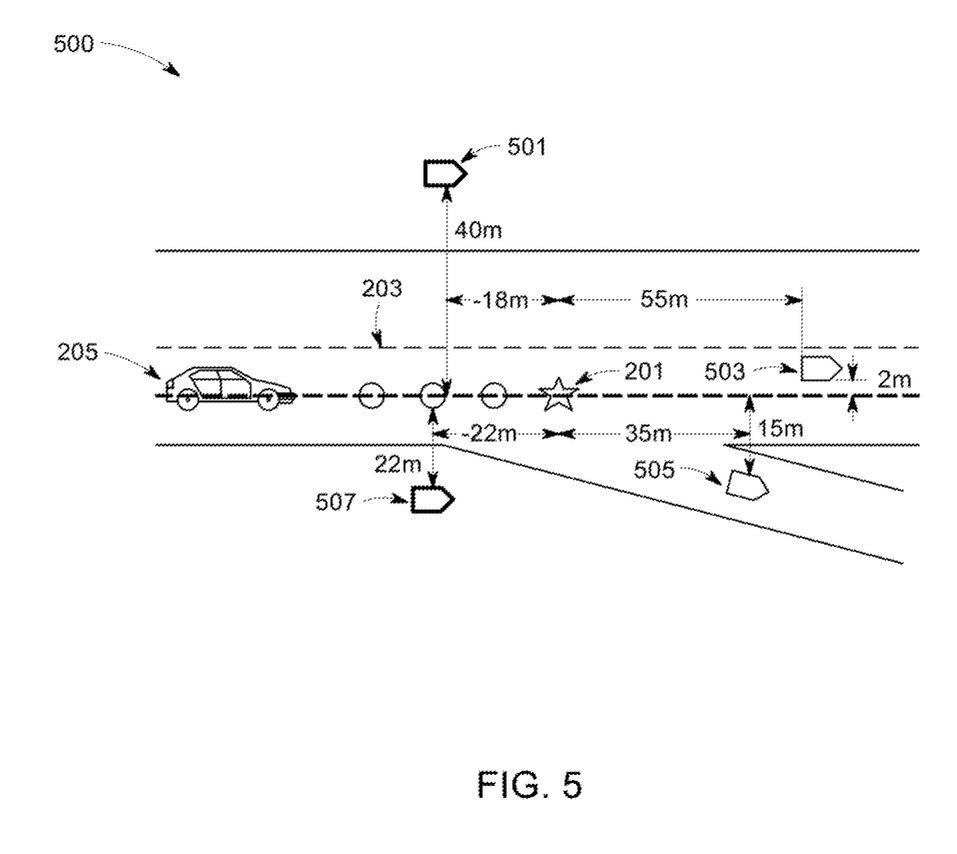
FIG. 5 illustrates an exemplary diagram illustrating a plurality of distance ranges for static object matching according to an example embodiment.

Once the heading filter has been applied, further a line of sight filter based on a distance criteria or distance filter may be applied to the one or more candidate objects.

In most cases, there may be only one gantry that passes through the Spatial Filter. However, since many of the messages received may not actually be from gantry observation, the "Line of Sight Filter" may still be applied. FIG. 5 illustrates the various parameters involved in applying the distance based line of sight filter.

FIG. 5 illustrates an exemplary diagram 500 illustrating a plurality of distance ranges for static object matching according to an example embodiment.

The line of sight is the line which connects the two trace points closest to the observation point (shown in dotted line in diagram 500). In this step, it is necessary to compute the distance of each candidate object 501-507 to the line of travel: these distances are shown perpendicular to the line of travel in diagram 500. Since these distances are at a 90-degree angle to the line of sight, they will be referred to as "projection" distances. For example, the object 501 is at projection distance of 40 m, the object 503 is at a projection distance of 2 m, the object 505 is at a projection distance of 15 m and the object 507 is at a projection distance of 22 m from the line of travel.

In this example, any objects with projection distance larger than 20 meters would be filtered out. Thus, the objects 501 and 507, with projection distances of 40 m and 22 m respectively are filtered out.

For the remaining objects, it is necessary to compute the distance from each object's intersection with line of travel to the observation point: these distances are shown in parallel to the line of travel in diagram 500 and will be referred to as "travel" distances. For example, the object 501 is at a travel distance of −18 m, the object 503 is at a travel distance of 55 m, the object 505 is at a travel distance of 35 m, and the object 507 is at a travel distance of −22 m from the line of travel respectively.

In an example, any objects with travel distance larger than 80 meters or smaller than −20 meters may be filtered out. Note that a negative travel distance indicates that the object is behind the observation point. This is possible due to a slight error in the coded positions of objects and due to possible GPS signal inaccuracies.

Finally, if there is still more than one object remaining, then the object with the smallest projection distance is selected. Thus, of the remaining objects 503 and 505, the object 503 had the projection distance of 2 m and the object 505 had the projection distance of 15 m, thus, the object 503 is the selected object. The selected object 503 is shown in solid filled pentagon in the diagram 500.

In an example, the projection distance may be compared to a predefined threshold, which may be set to such as at 35 meters, and then the travel distance may be computed.

In many example embodiments, the projection distance threshold may be set to as large as 35 meters due to various factors including but not limited to map errors; GPS noise such as when driving through tunnels and in mountains, noise in GPS signal reduces its accuracy and errors of 10-15 meters are common; and sharp turns, such as when a gantry is on a sharp turn, the point of intersection may end up being a little far from the gantry.

Finally, once all the distance filters have been applied, one or more remaining objects may be matched to the coordinates in the geospatial message.

The various filters discussed above may be used to implement an algorithm for matching the geospatial message to one or more static objects. The algorithm may be illustrated by the method of FIG. 6 illustrated next.

Figure 6:
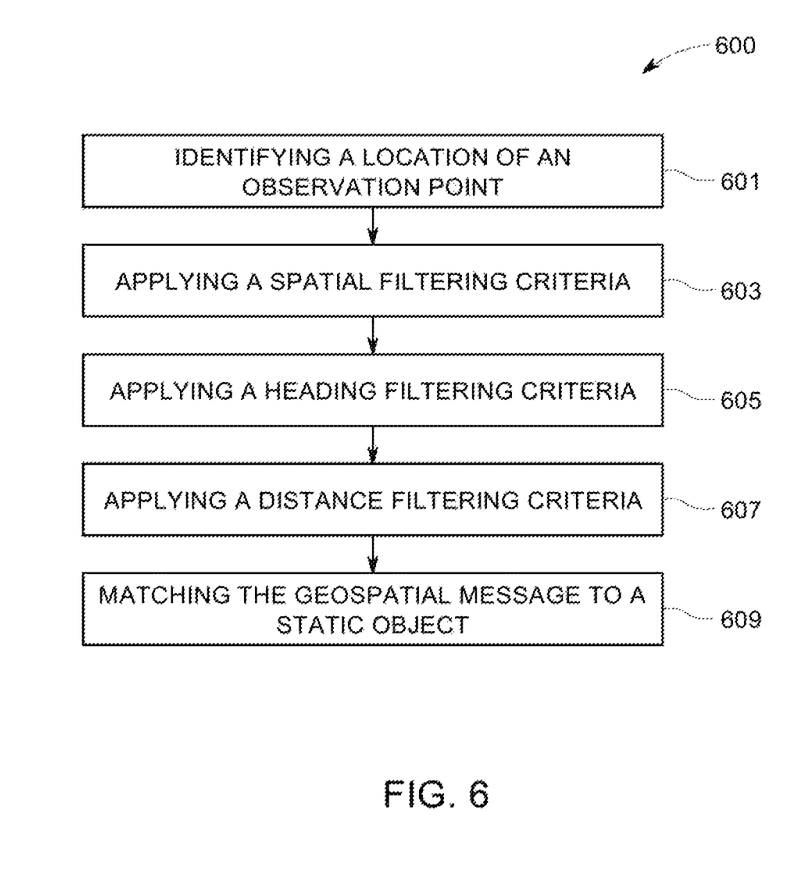
FIG. 6 illustrates a flow diagram of a method for static object matching according to an example embodiment.

FIG. 6 illustrates a flow diagram of a method 600 for static object matching according to an example embodiment.

The method 600 may include, at 601, identifying a location of an observation point for taking observation of the one or more static objects. The observation may be taken such as using one or more vehicle sensors, including the vehicle camera, for capturing an image of the one or more static objects. The locations of the observation point may be identified using two trace points closest to the observation point, as discussed previously. Once the location of the observation point has been computed, the method 600 may include, at 603, applying a spatial filtering criteria to the one or more static objects. The spatial filtering criteria may include checking the distance of each of the one or more static objects from the observation point and filtering out those one or static objects which are more than an observable distance away from the observation point. Once the spatial filtering criteria has been applied, a list of one or more filtered static objects may be obtained.

Further, a heading of the vehicle, such as the vehicle 205 in FIG. 2 may be computed and may be used, at 605, to apply a heading filtering criteria to the one or more filtered static objects. The heading filtering criteria may include comparing a heading difference between the heading of the vehicle and a pre-computed heading of each of the one or more filtered static objects to provide one or more candidate objects. For example, heading filtering criteria may include filtering out all the static objects with heading difference of more than 30 degrees from the heading of the vehicle. After the filtering in step 605, a list of one or more candidate objects may be identified. To this list, at 607, a distance filtering criteria may be applied.

The distance filtering criteria may be based on a first distance and a second distance. In an example embodiment, the first distance may be the travel distance and the second distance may be the projection distance, as discussed previously in conjunction with FIG. 5. Based on the distance filter, one or more remaining objects may be identified, and at 609, the one or more remaining objects may be matched to the geospatial message, such as to the coordinates of the geospatial message.

In an example embodiment, the matching of the correct object to the geospatial message using the method 600 may be used in performing accurate navigation related functions using a navigation device installed in a vehicle, such as the vehicle 103. For example, the vehicle 103 may be a semi-autonomous vehicle, which may use the matching of sensor data with a mapping navigation application to perform navigation of the vehicle along a route.

In an example embodiment, the matching of the stationary objects on a link with map data using the method 600 may be used to update a map database for a mapping application, to provide accurate map data.

In an example embodiment, the matching of the stationary objects on a link, such as speed limit signs or gantries, with sensor based geo-spatial messages may be used to provide speed limit related recommendations to a user of a vehicle.

In an example embodiment, an apparatus for performing the method 600 of FIG. 6 above may comprise a processor (e.g. the processor 111) configured to perform some or each of the operations of the method of FIG. 6 described previously. The processor may, for example, be configured to perform the operations (601-609) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (601-609) may comprise, for example, the processor 111 which may be implemented in the user equipment 101 and/or a device or circuit for executing instructions or executing an algorithm for processing information as described above.

The methods and systems disclosed herein may greatly improves on the required resources for matching messages to objects. These resources may include such as memory usage, CPU usage and the like. Thus, the methods and systems disclosed herein may improve on the quality of the process of static object matching by allowing messages to be matched to objects located on links which the vehicle did not actually travel on.

Many modifications and other embodiments of the invention set forth herein will come to mind to one skilled in the art to which these inventions pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method for matching a geospatial message to one or more static objects on a link comprising:
    identifying a location of an observation point for observing the one or more static objects from a vehicle on the link;
    applying a spatial filtering criteria to each of the one or more static objects based on an observable distance of each of the one or more static objects from the location of the observation point to filter the one or more static objects, wherein the filtering the one or more static objects provides one or more filtered static objects;
    calculating, by a processor, a heading of the vehicle;
    applying a heading filtering criteria to the one or more filtered static objects based on the heading of the vehicle and a pre-computed heading of each of the one or more filtered static objects to provide one or more candidate objects;
    applying a distance filtering criteria to each of the one or more candidate objects to provide one or more remaining objects; and
    matching the geospatial message to at least one of the one or more remaining objects based on the distance filtering criteria.

2. The method of claim 1, wherein the distance filtering criteria includes a first distance and a second distance.

3. The method of claim 2, wherein the first distance comprises a projection distance of each of the one or more candidate objects on a line of sight passing through the observation point.

4. The method of claim 2, wherein the second distance comprises a travel distance comprising a distance between an intersection point of each of one or more candidate objects with a line of sight passing through the observation point and the location of the observation point.

5. The method of claim 2, wherein matching the geospatial message to at least one of the one or more remaining objects based on the distance filtering criteria further comprises:
    filtering the one or more remaining objects based on a comparison of the first distance with a first distance threshold to provide reduced one or more remaining objects;
    filtering the reduced one or more remaining objects based on a comparison of the second distance with a second distance threshold to provide one or more matching objects;
    selecting a matched object with smallest first distance from the one or more matching objects; and
    matching the matched object with the geospatial message.

6. The method of claim 1, wherein identifying the location of the observation point further comprises computing a latitude value and a longitude value of the observation point based on locations of two trace points closest to the observation point, wherein the computing includes at least one of an interpolation and an extrapolation.

7. The method of claim 1, wherein calculating the heading of the vehicle further comprises calculating the heading of the vehicle using one or more trace points closest to the observation point.

8. The method of claim 1, wherein applying the heading filtering criteria comprises comparing a difference between the heading of the vehicle and the pre-computed heading of the each of the one or more filtered static objects to a heading difference threshold.

9. An apparatus for matching a geospatial message to one or more static objects on a link, the apparatus comprising:
    at least one processor; and
    at least one memory including computer program code for one or more programs, the at least one memory and the computer program code configured to, with the at least one processor, cause the apparatus to perform at least the following:
        identify a location of an observation point for observing the one or more static objects from a vehicle on the link;
        apply a spatial filtering criteria to each of the one or more static objects based on an observable distance of each of the one or more static objects from the location of the observation point to filter the one or more static objects, wherein the filtering the one or more static objects provides one or more filtered static objects;
        calculate a heading of the vehicle;
        apply a heading filtering criteria to the one or more filtered static objects based on the heading of the vehicle and a pre-computed heading of each of the one or more filtered static objects to provide one or more candidate objects;
        apply a distance filtering criteria to each of the one or more candidate objects to provide one or more remaining objects; and
        match the geospatial message to at least one of the one or more remaining objects based on the distance filtering criteria.

10. The apparatus of claim 9, wherein the distance filtering criteria includes a first distance and a second distance.

11. The apparatus of claim 10, wherein the first distance comprises a projection distance of each of the one or more candidate objects on a line of sight passing through the observation point.

12. The apparatus of claim 10, wherein the second distance comprises a travel distance comprising a distance between an intersection point of each of one or more candidate objects with a line of sight passing through the observation point and the location of the observation point.

13. The apparatus of claim 10, wherein to match the geospatial message to at least one of the one or more remaining objects based on the distance filtering criteria, the apparatus is further caused to:
    filter the one or more remaining objects based on a comparison of the first distance with a first distance threshold to provide reduced one or more remaining objects;

filter the reduced one or more remaining objects based on a comparison of the second distance with a second distance threshold to provide one or more matching objects;

select a matched object with smallest first distance from the one or more matching objects; and match the matched object with the geospatial message.

14. The apparatus of claim 9, wherein to identify the location of the observation point, the apparatus is further caused to: compute a latitude value and a longitude value of the observation point based on locations of two trace points closest to the observation point, wherein the compute includes at least one of an interpolation and an extrapolation.

15. The apparatus of claim 9, wherein to calculate the heading of the vehicle, the apparatus is further caused to: calculate the heading of the vehicle using one or more trace points closest to the observation point.

16. The apparatus of claim 9, wherein to apply the heading filtering criteria, the apparatus is further caused to: compare a difference between the heading of the vehicle and the pre-computed heading of the each of the one or more filtered static objects to a heading difference threshold.

17. A computer program product for matching a geospatial message to one or more static objects on a link comprising at least one non-transitory computer-readable storage medium having computer-executable program code instructions stored therein, the computer-executable program code instructions comprising program code instructions for:

identifying a location of an observation point for observing the one or more static objects from a vehicle on the link;

applying a spatial filtering criteria to each of the one or more static objects based on an observable distance of each of the one or more static objects from the location of the observation point to filter the one or more static objects, wherein the filtering the one or more static objects provides one or more filtered static objects;

calculating, by a processor, a heading of the vehicle;

applying a heading filtering criteria to the one or more filtered static objects based on the heading of the vehicle and a pre-computed heading of each of the one or more filtered static objects to provide one or more candidate objects;

applying a distance filtering criteria to each of the one or more candidate objects based on a first distance and a second distance, to provide one or more remaining objects; and matching the geospatial message to at least one of the one or more remaining objects based on the first distance and the second distance.

18. The computer program product of claim 17, wherein identifying the location of the observation point further comprises computing a latitude value and a longitude value of the observation point based on locations of two trace points closest to the observation point, wherein the computing includes at least one of an interpolation and an extrapolation.

19. The computer program product of claim 17, wherein calculating the heading of the vehicle further comprises calculating the heading of the vehicle using one or more trace points closest to the observation point.

20. The computer program product of claim 17, wherein applying the heading filtering criteria comprises comparing a difference between the heading of the vehicle and the pre-computed heading of the each of the one or more filtered static objects to a heading difference threshold.

* * * * *